United States Patent
Shiraishi et al.

(10) Patent No.: US 8,532,457 B2
(45) Date of Patent: Sep. 10, 2013

(54) METHOD OF MANUFACTURING OPTICAL WAVEGUIDE, OPTICAL WAVEGUIDE AND OPTICAL TRANSMISSION DEVICE

(75) Inventors: Akinori Shiraishi, Nagano (JP); Yuichi Taguchi, Nagano (JP)

(73) Assignee: Shinko Electric Industries Co., Ltd., Nagano-shi, Nagano (JP)

( * ) Notice: Subject to any disclaimer, the term of this patent is extended or adjusted under 35 U.S.C. 154(b) by 203 days.

(21) Appl. No.: 12/969,832

(22) Filed: Dec. 16, 2010

(65) Prior Publication Data
US 2011/0150405 A1    Jun. 23, 2011

(30) Foreign Application Priority Data
Dec. 18, 2009 (JP) .................................. 2009-287926

(51) Int. Cl.
*G02B 6/10* (2006.01)

(52) U.S. Cl.
USPC ................................ 385/129; 385/14; 216/24

(58) Field of Classification Search
USPC ....................................... 385/123, 129, 88–93
See application file for complete search history.

(56) References Cited

U.S. PATENT DOCUMENTS

| | | | | |
|---|---|---|---|---|
| 5,757,029 A * | 5/1998 | Narui et al. | ...................... | 257/64 |
| 6,168,964 B1 * | 1/2001 | Hamaguchi | ...................... | 438/44 |
| 7,242,822 B2 * | 7/2007 | Yamada et al. | ................. | 385/14 |
| 7,428,351 B2 * | 9/2008 | Jenkins et al. | ................. | 385/14 |
| 2001/0019531 A1 * | 9/2001 | Sugawara | ...................... | 369/121 |
| 2003/0123805 A1 * | 7/2003 | Akashi et al. | ................... | 385/49 |
| 2004/0190814 A1 * | 9/2004 | Suzuki | ............................ | 385/14 |
| 2005/0175273 A1 * | 8/2005 | Iida et al. | ......................... | 385/15 |
| 2009/0041409 A1 * | 2/2009 | Hopkins | ........................ | 385/14 |
| 2009/0290836 A1 * | 11/2009 | Lee et al. | ......................... | 385/33 |

FOREIGN PATENT DOCUMENTS

| | | |
|---|---|---|
| JP | 2-118607 | 5/1990 |
| JP | 8-046292 | 6/1996 |
| JP | 2008197380 A * | 8/2008 |

* cited by examiner

*Primary Examiner* — Ellen Kim
(74) *Attorney, Agent, or Firm* — Drinker Biddle & Reath LLP (57) ABSTRACT

A method for manufacturing an optical waveguide which includes a core configured to transmit an optical signal, and a mirror portion configured to reflect the optical signal, the method includes: forming a mask layer patterned in a predetermined shape, on a first crystal plane of a substrate made of a crystalline material; etching the first crystal plane by a wet-etching using the mask layer to form a groove having a plurality of crystal planes; providing a metallic reflection film on at least one of the plurality of crystal planes to form the mirror portion; and providing the groove with a core material to form the core.

4 Claims, 13 Drawing Sheets

METHOD OF MANUFACTURING OPTICAL WAVEGUIDE, OPTICAL WAVEGUIDE AND OPTICAL TRANSMISSION DEVICE

BACKGROUND

1. Field of the Invention

The present invention relates to an optical waveguide which includes a core for transmitting an optical signal, and a mirror for reflecting the optical signal, a method of manufacturing the optical waveguide, and an optical transmission device which includes the optical waveguide.

2. Description of the Related Art

Heretofore, in multifarious electronic circuits, optical/electrical hybrid circuits in each of which part of the corresponding circuit is changed from electrical wiring of copper or the like into optical wiring based on an optical waveguide have been employed with the raised speed (heightened frequency) of signal transfer, and various relevant techniques have been proposed (refer to JP-A-2-118607 and JP-A-8-46292).

In general, in an optical/electrical hybrid circuit, a light emitting element such as vertical cavity surface emitting laser (VCSEL) and a light receiving element such as photodiode (PD) are mounted on a circuit board, and light (an optical signal) emitted from the light emitting element enters the light receiving element through an optical waveguide.

In such an optical/electrical hybrid circuit, there is adopted a method wherein the light vertically emitted from the light emitting element toward the circuit board is reflected 90 degrees so as to become horizontal to the circuit board, by a mirror portion whose light travel direction has an angle of 45 degrees, whereby the light propagates within the optical waveguide.

Here, a method of manufacturing an optical waveguide 101 according to a prior-art example will be explained.

Figure 12:
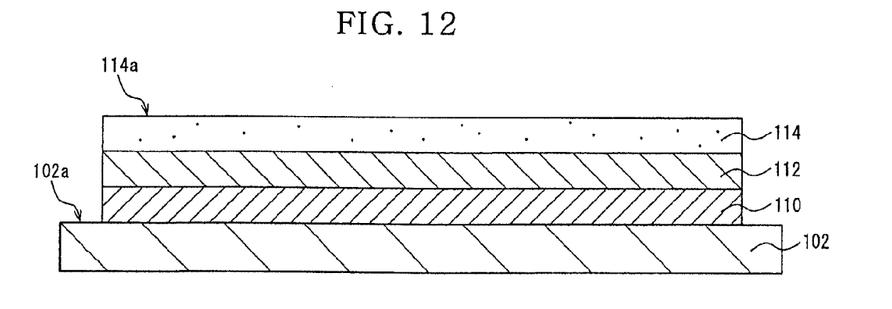
FIG. 12 is an explanatory view for explaining a method of manufacturing an optical waveguide according to a prior-art example.

First, as shown in FIG. 12, the step of successively stacking a first clad layer 110, a core 112 and a second clad layer 114 on a dummy board 102 is performed by well-known techniques. Any of the layers is formed using a resin material which is capable of transmitting an optical signal (for example, silicone), and a material of relatively high refractive index is used for the core 112, whereas a material of relatively low refractive index is used for the first clad layer 110 and the second clad layer 114.

Figure 13:
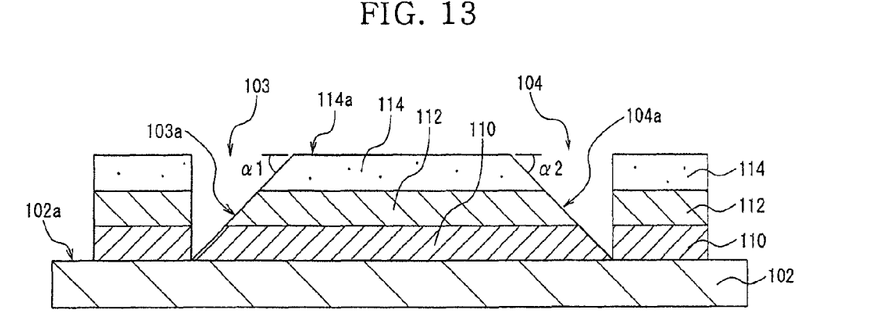
FIG. 13 is an explanatory view for explaining the method of manufacturing the optical waveguide according to the prior-art example.

Subsequently, as shown in FIG. 13, the step of forming V-shaped grooves 103 and 104 which divide the core 112 is performed by a dicer (dicing device) from the side of the second clad layer 114. On this occasion, the grooves 103 and 104 are formed so that an angle α1 which is defined between a slant surface 103a constituting the groove 103 and the upper surface 114a of the second clad layer 114, and an angle α2 which is defined between a slant surface 104a constituting the groove 104 and the upper surface 114a of the second clad layer 114 may become 45 degrees, respectively.

Incidentally, another example of the step of forming the grooves 103 and 104 may be performed such that a gray mask is provided on the upper surface 114a of the second clad layer 114, and that the slant surfaces 103a and 104a which define the angles α1 and α2 of 45 degrees, respectively, similarly to the above are formed by a known photolithographic process (not shown).

Figure 14:
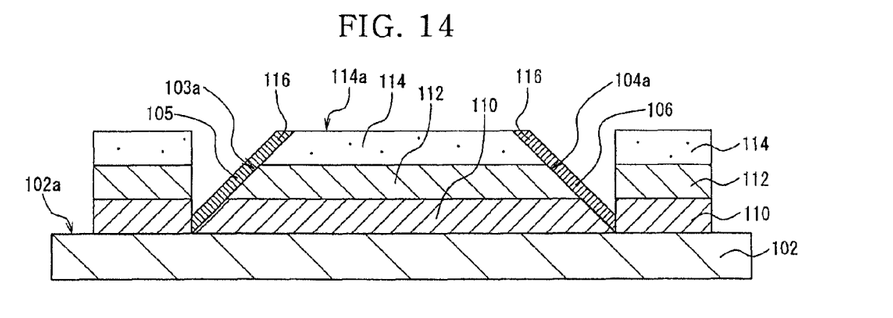
FIG. 14 is an explanatory view for explaining the method of manufacturing the optical waveguide according to the prior-art example.

Subsequently, as shown in FIG. 14, the step of forming metallic reflection films 116 on the slant surface 103a of the groove 103 and the slant surface 104a of the groove 104 is performed. Thus, a mirror 105 is formed on the slant surface 103a, and a mirror 106 on the slant surface 104a.

Figure 15:
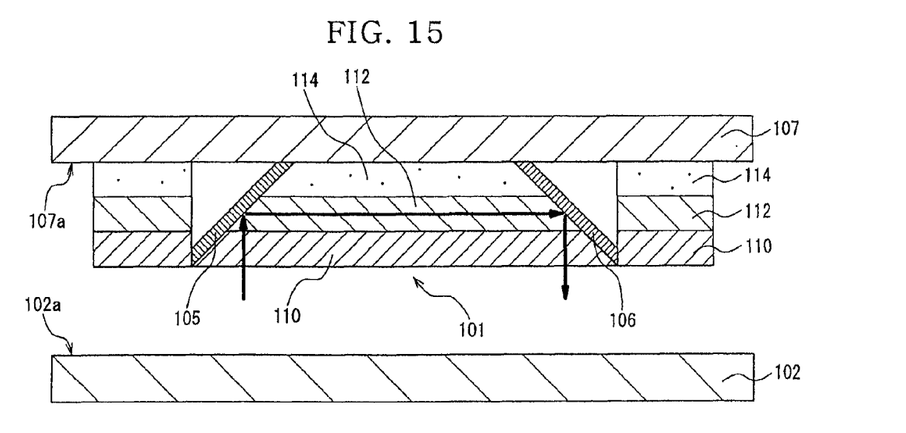
FIG. 15 is an explanatory view for explaining the method of manufacturing the optical waveguide according to the prior-art example.

Subsequently, as shown in FIG. 15, the step of transferring the resulting structure on the dummy board 102, from the dummy board 102 onto a formal board 107 is performed. The manufacture of the optical waveguide 101 is carried out including the steps explained above. Incidentally, arrows in FIG. 15 indicate a path along which the optical signal passes.

In the above manufacturing method, however, it has been difficult to highly precisely and minutely form the slant surfaces 103a and 104a on which the mirrors 105 and 106 are respectively disposed. More specifically, when the slant surfaces 103a and 104a are formed by the dicing, the surface roughness thereof becomes large. This can lead to the problem that light propagation losses appear in the mirrors 105 and 106 which are fabricated by forming the metallic reflection films 116 on the surfaces 103a and 104a. On the other hand, when the slant surfaces 103a and 104a are formed by the photolithographic process, it is difficult to form the angles α1 and α2 accurately at 45[°] with respect to the upper surface 114a of the second clad layer 114. This can lead to the problem that light propagation losses appear in the mirrors 105 and 106 which are fabricated by forming the metallic reflection films 116 on the surfaces 103a and 104a.

Besides, in case of performing the steps of forming the structure on the dummy board 102 and thereafter transferring the structure onto the formal board 107 as stated above, there has been the problem that the positioning precision between the optical waveguide 101 and the formal board 107 worsens.

Besides, the optical waveguide portion is protuberant beyond the mounting surface 107a of the formal board 107 in correspondence with its thickness. This has led to the problem that a mounting pad for mounting electronic components such as a light emitting element and a light receiving element must be formed having a raised level.

SUMMARY

In view of the above circumstances, the present invention has for its object to provide a method of manufacturing an optical waveguide as is capable of manufacturing a highly precise and minute optical waveguide.

According to an aspect of the invention, there is provided a method for manufacturing an optical waveguide which includes a core configured to transmit an optical signal, and a mirror portion configured to reflect the optical signal, the method including: forming a mask layer patterned in a predetermined shape, on a first crystal plane of a substrate made of a crystalline material; etching the first crystal plane by a wet-etching using the mask layer to form a groove having a plurality of crystal planes; providing a metallic reflection film on at least one of the plurality of crystal planes to form the mirror portion; and providing the groove with a core material to form the core.

According to another aspect of the invention, there is provided an optical waveguide including: a groove having a plurality of crystal planes formed by wet-etching a first crystal plane of a substrate made of a crystalline material; a mirror portion configured to reflect an optical signal, the mirror being formed by providing a metallic reflection film on at least one of the plurality of crystal planes; a core configured to transmit an optical signal, the core being provided on the groove with a core material; and a clad layer that covers at least a part of the core. Further, according to still another aspect of the invention, there is provided an optical transmission device including: an optical waveguide including: a groove having a plurality of crystal planes formed by wet-etching a first crystal plane of a substrate made of a crystalline material; a first and second mirrors that are formed by providing metallic reflection films on two of the plurality of crystal planes as oppose defining an angle of 90°; a core configured to transmit an optical signal, the core being provided on the groove with a core material; and a clad layer that covers at least a part of the core; a light emitting element disposed on the substrate, the light emitting element being configured to project the optical signal to the first mirror; and a light receiving element disposed on the substrate, the light emitting element being configured to receive the optical signal reflected by the first mirror and then reflected by the second mirror.

According to the disclosed method of manufacturing an optical waveguide, it is permitted to manufacture a highly precise and minute optical waveguide having mirrors whose surface roughness is small and for which slant surfaces are formed at accurate inclination angles. Besides, the optical waveguide may be used as a transmission line between a logic circuit and a memory.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

There will be described a method of manufacturing an optical waveguide 1 according to the first embodiment of the present invention. Here, FIGS. 1A through 6B are schematic views for explaining the manufacturing steps of the method.

Figure 1A:
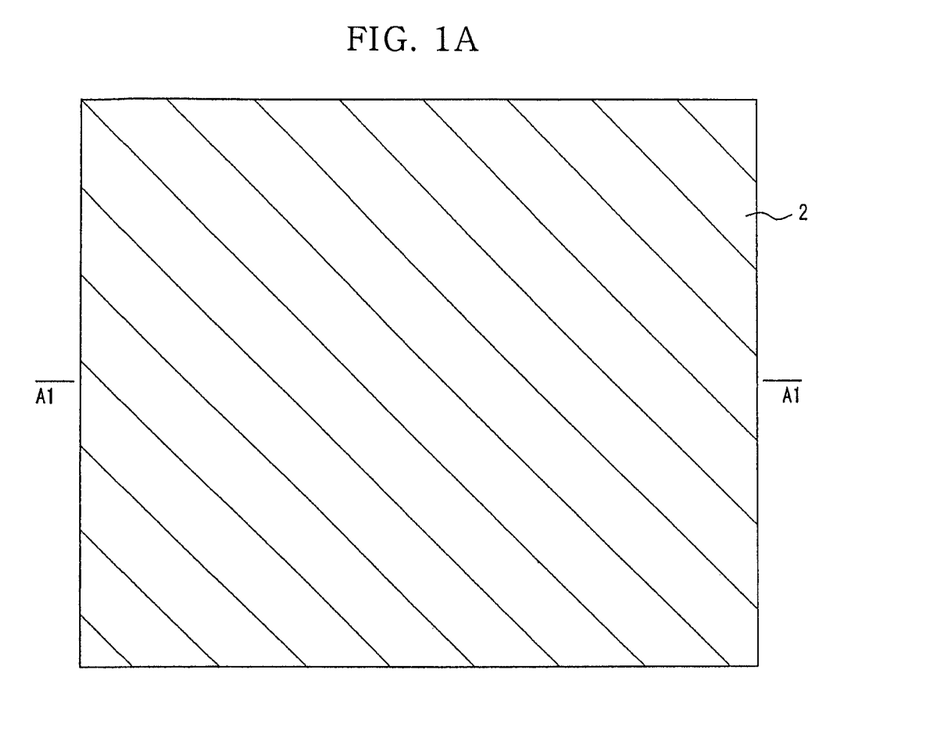
FIGS. 1A and 1B are explanatory views for explaining a method of manufacturing an optical waveguide according to the first embodiment of the present invention.
Figure 1B:
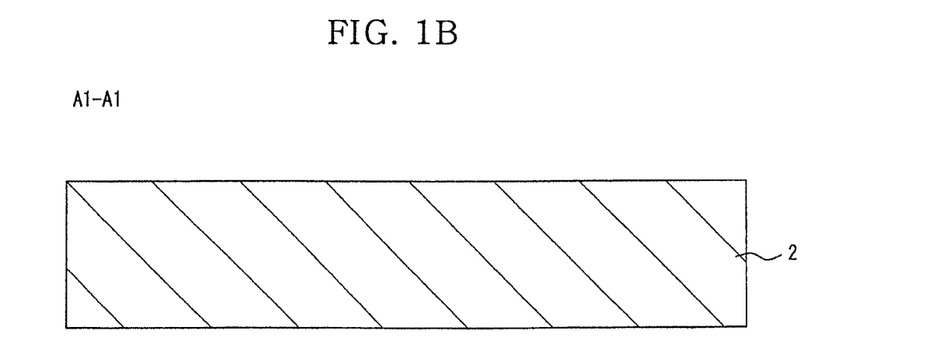

First, a substrate 2 shown in FIGS. 1A and 1B is prepared. FIG. 1A is a plan view of the substrate 2, while FIG. 1B is a sectional view thereof. In this embodiment, the substrate 2 used is made of a crystalline material. Here, as an example of the crystalline material, Si (silicon) single-crystal is suitable for reasons to be stated later.

Figure 2A:
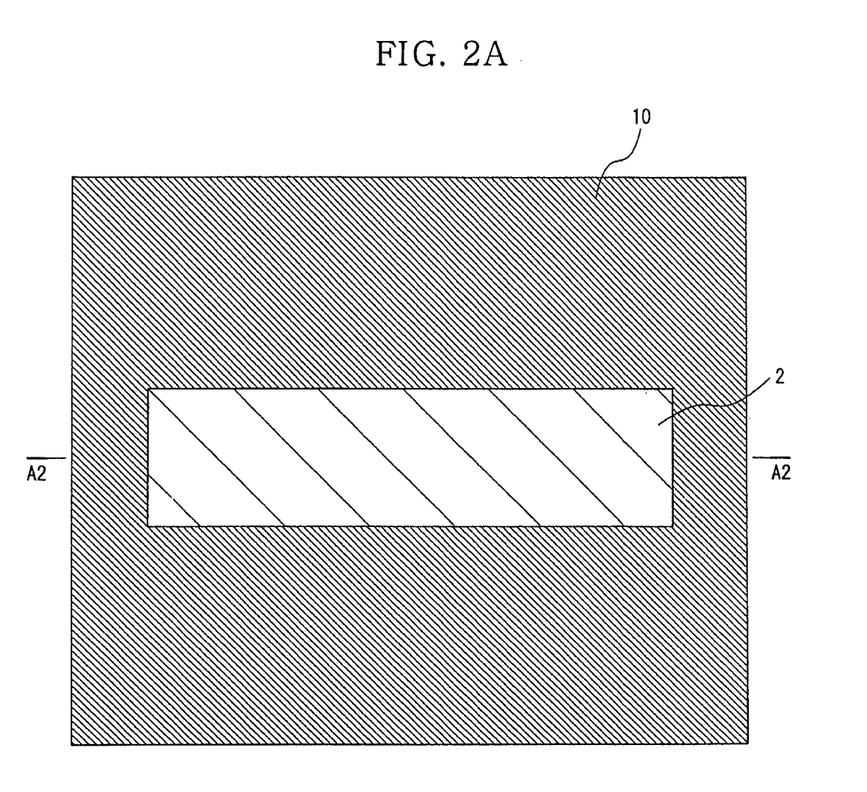
FIGS. 2A and 2B are explanatory views for explaining the method of manufacturing the optical waveguide according to the first embodiment of the present invention.
Figure 2B:
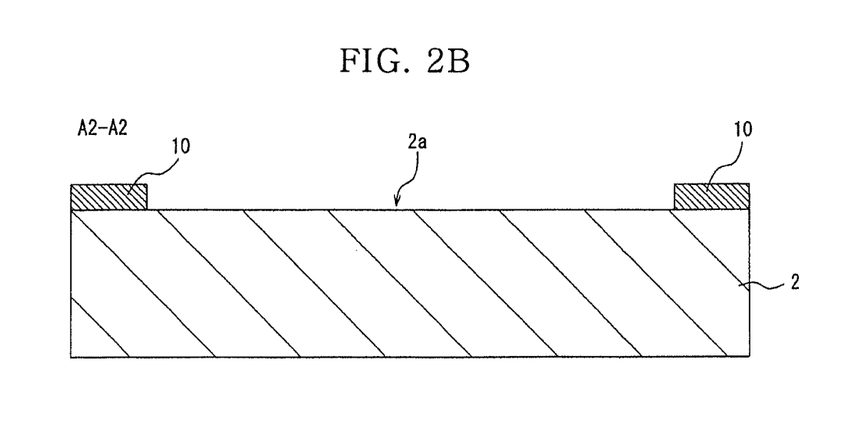

Subsequently, as shown in FIG. 2A (a plan view) and FIG. 2B (a sectional view), the step of forming a mask layer patterned into a predetermined shape, on one predetermined crystal plane (here, (100)-plane) 2a of the substrate 2 is performed.

Incidentally, as an example of a method of forming the mask layer 10, there is considered a method wherein a resist material is applied by a known photolithographic process, and a pattern is formed by exposure and development.

Figure 3A:
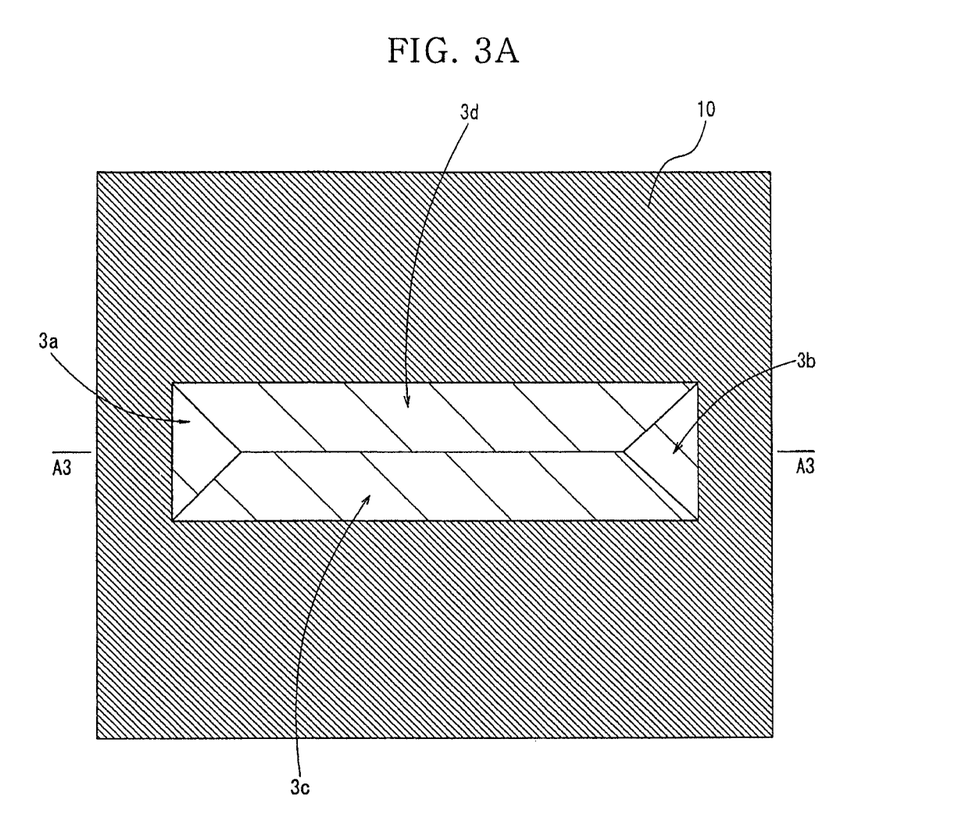
FIGS. 3A, 3B and 3C are explanatory views for explaining the method of manufacturing the optical waveguide according to the first embodiment of the present invention.
Figure 3B:
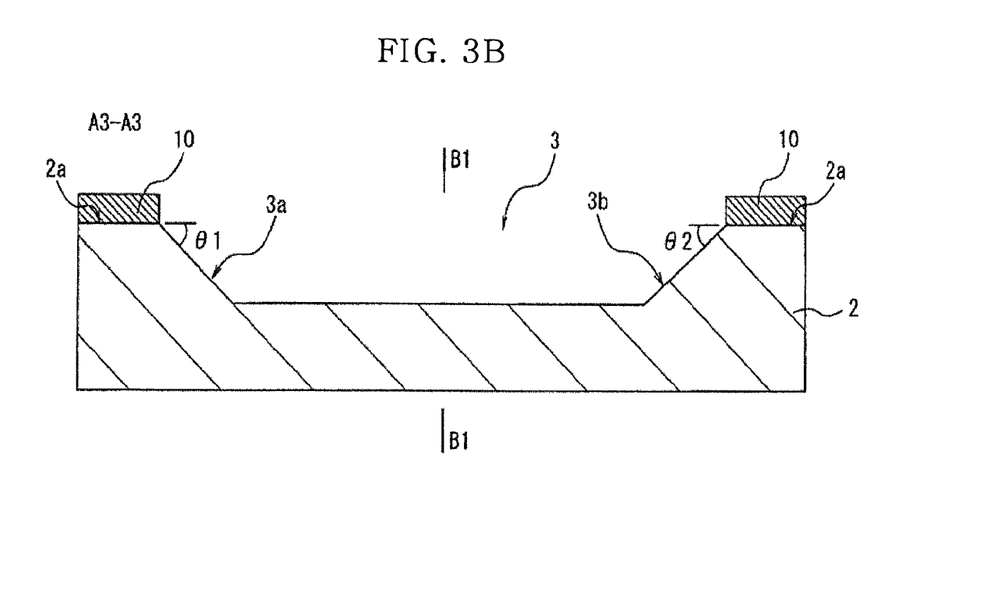
Figure 3C:
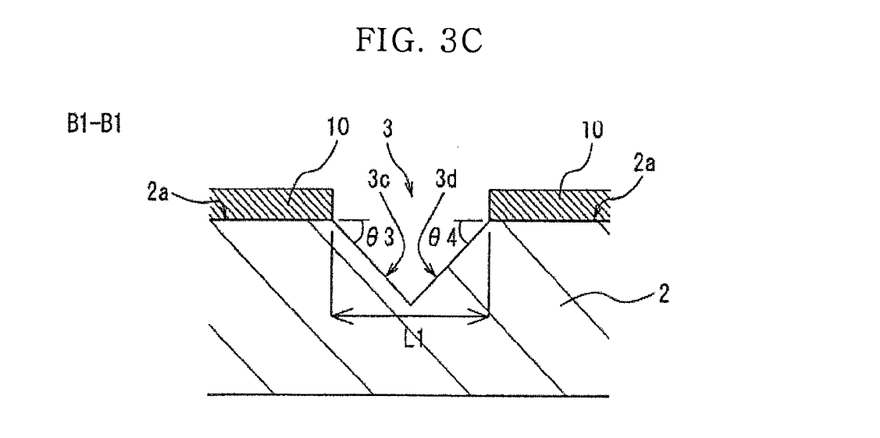

Subsequently, as shown in FIG. 3A (a plan view), FIG. 3B (a sectional view) and FIG. 3C (a sectional view), the step of etching the (100)-plane 2a of the substrate 2 is performed by a wet etching process which uses the mask layer 10 as an etching mask.

As stated before, the substrate 2 is formed of the single crystal of Si (silicon). The Si (silicon) single-crystal is such that another crystal plane (here, (110)-plane) defines an angle of 45[°] to one crystal plane (here, (100)-plane). In this regard, there is known the anisotropic etching technique that, when the (100)-plane of the Si (silicon) single-crystal is wet-etched using an alkaline etchant, the (110)-plane defining the angle of 45 [°] to the (100)-plane is formed. By way of example, a KOH (potassium hydroxide) aqueous solution, or the KOH (potassium hydroxide) aqueous solution into which a predetermined additive (for example, an alcohol, a surfactant or a very small amount of metal element is known) is added, is employed for the alkaline etchant.

More specifically, according to the above etching step, the etching proceeds so that four (110)-planes may appear, and it is permitted to form a groove 3 whose inwalls are the four (110)-planes. Regarding the groove 3, in more detail, the four planes of the groove 3 are respectively surrounded with the (110)-planes 3a, 3b, 3c and 3d which are inclined at the angle of 45[°] to the (100)-plane 2a. That is, the groove 3 has such a shape that a sectional shape parallel to the (100)-plane 2a is an oblong, that a sectional shape perpendicular to the (100)-plane 2a and perpendicular to the (110)-planes 3a and 3b is an inverted trapezoid (it may well be an inverted triangle), and that a sectional shape perpendicular to the (100)-plane 2a and perpendicular to the (110)-planes 3c and 3d is an inverted triangle. Incidentally, the widthwise dimension L1 of the upper part of the groove 3 in FIG. 3C is L1=15 through 35 [μm] or so.

On this occasion, the individual (110)-planes 3a, 3b, 3c and 3d are planes which are prescribed by a crystal alignment structure peculiar to the Si single-crystal, and hence, they can be obtained as planes which accurately define the angles of θ1=θ2=θ3=θ4=45[°] to the (100)-plane 2a. In addition, they can be obtained as highly precise and minute flat planes whose surface roughness is much smaller as compared with the surface roughness of planes cut by dicing or the like.

Figure 4A:
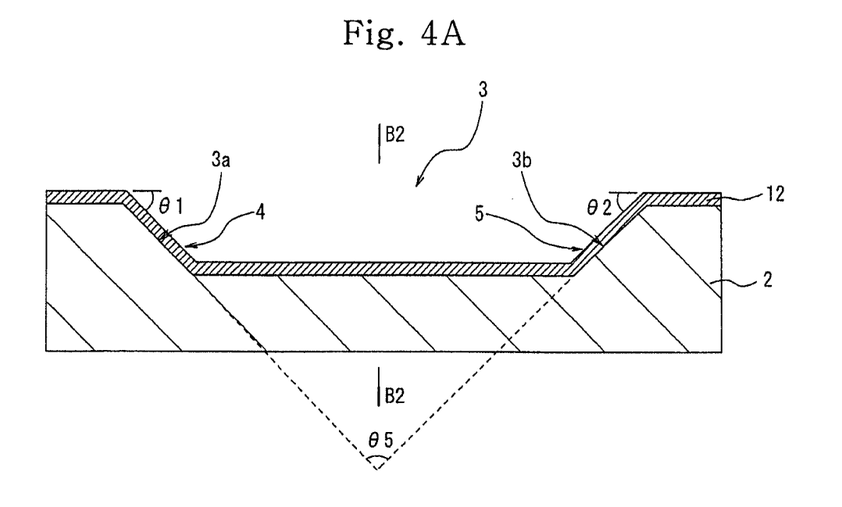
FIGS. 4A and 4B are explanatory views for explaining the method of manufacturing the optical waveguide according to the first embodiment of the present invention.
Figure 4B:
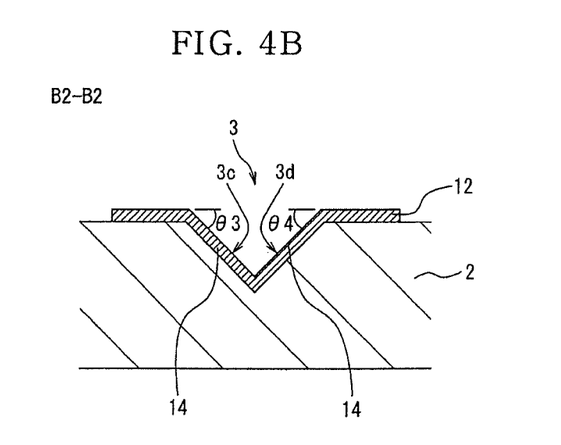

Subsequently, as shown in FIG. 4A (a sectional view) and FIG. 4B (a sectional view), the step of removing the mask layer 10 and thereafter providing a metallic reflection film 12 on the (110)-planes which constitute the inwalls of the groove 3, thereby to form a mirror, is performed. Here, FIG. 4A is the sectional view of the same position as in FIG. 3B (hereinafter, the same holds true of FIG. 5A, FIG. 6A, FIG. 7A, FIG. 8A and FIG. 9A). As an example, the metallic reflection film 12 is formed by employing Al (aluminum) and sputtering. Incidentally, another metal material such as Au (gold) or any alloy material may well be employed, and the mirror may well be formed by a method such as vacuum evaporation.

By way of example, in case of forming one mirror, a mirror 4 is formed by providing the metallic reflection film 12 on one (110)-plane 3a.

On the other hand, in case of forming two mirrors as in case of applying the optical waveguide to an optical transmission device in which an optical signal is projected from a light emitting element to one mirror of the optical waveguide, and the optical signal reflected by one mirror and further reflected by the other mirror is received by a light receiving element, two mirrors 4 and 5 are formed by providing the metallic reflection films 12 on the two opposing (110)-planes 3a and 3b.

Here, FIGS. 4A and 43 illustrate the example in the case where the metallic reflection film 12 is formed on the whole surface within the groove 3. On this occasion, the metallic reflection films 12 formed on the other (110)-planes 3c and 3d as are not used as the mirrors 4 and 5 function as first clad layers 14.

Incidentally, a position where the metallic reflection film 12 is formed may well be limited by providing a mask (not shown) or the like. In that case, however, a clad layer needs to be separately formed at a position where the metallic reflection film 12 is not used.

Here, as stated before, the individual (110)-planes 3a, 3b, 3c and 3d are the planes which are prescribed by the crystal alignment structure peculiar to the Si single-crystal, and hence, they can be obtained as the planes which accurately define the angles of θ1=θ2=θ3=θ4=45[°] to the (100)-plane 2a. In addition, especially the two opposing (110)-planes 3a and 3b can be obtained as planes as to which one plane 3a and the other plane 3b accurately define an angle of θ5=90[°].

Figure 5A:
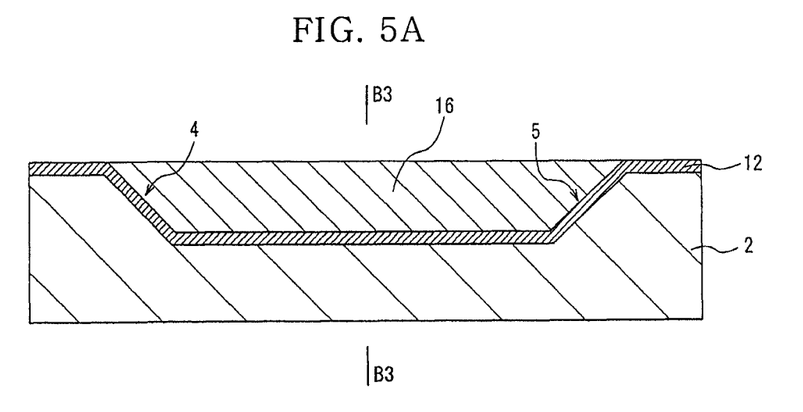
FIGS. 5A and 5B are explanatory views for explaining the method of manufacturing the optical waveguide according to the first embodiment of the present invention.
Figure 5B:
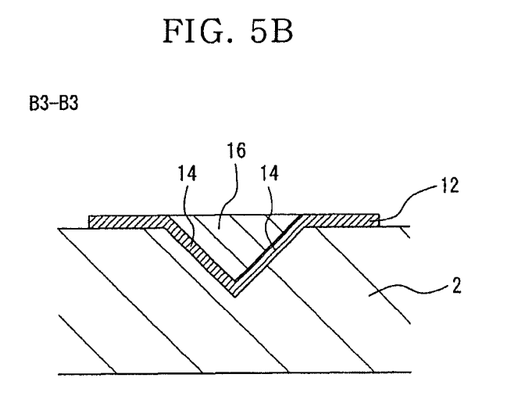

Subsequently, as shown in FIG. 5A (a sectional view) and FIG. 5B (a sectional view), the step of filling up the groove 3 with a core material and forming a core 16 is performed. As an example, a resin material, such as silicone resin or epoxy resin, capable of transmitting the optical signal (for example, laser light projected from a VCSEL) is employed as the core material.

Various methods are considered as a method of filling up the core material and forming the core 16. There is, for example, a method in which an unhardened filmy material is arranged, it is provided with a mask (not shown) and is patterned, and it is developed and hardened.

Figure 6A:
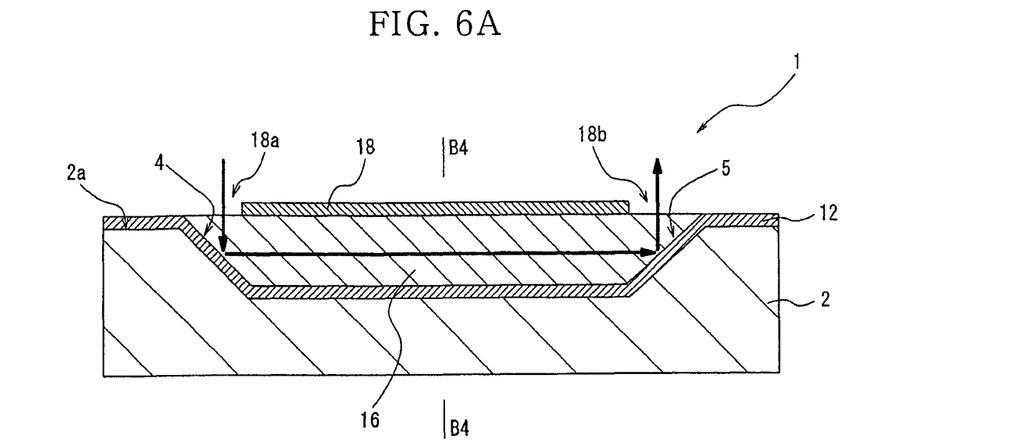
FIGS. 6A and 6B are explanatory views for explaining the method of manufacturing the optical waveguide according to the first embodiment of the present invention.

Subsequently, as shown in FIG. 6A (a sectional view) and FIG. 6B (a sectional view), the step of forming a second clad layer 18 so as to cover the upper surface of the core 16 is performed.

As an example, the second clad layer 18 is formed by employing Al (aluminum) and sputtering. Incidentally, another metal material such as Au (gold) or any alloy material may well be employed, and the second clad layer 18 may well be formed by a method such as vacuum evaporation.

Here, in the case where, as in this embodiment, the second clad layer 18 is formed using the metal material which does not transmit the optical signal, openings 18a and 18b for causing the optical signal to ingress into the core and to egress therefrom need to be provided at predetermined positions (in this embodiment, positions corresponding to the mirrors 4 and 5), respectively.

The manufacture of the optical waveguide 1 is carried out including the steps described above.

The optical waveguide 1 undergoes an operation in which, as indicated by arrows in FIG. 6A, the optical signal perpendicularly emitted from the light emitting element (not shown) toward the upper surface 2a of the substrate 2 enters into the core 16, it is reflected 90[°] so that its traveling direction may become parallel to the upper surface 2a of the substrate 2, by the mirror 4 having the angle of 45[°], it is propagated within the core 16, it is further reflected 90[°] so that its traveling direction may become perpendicular to the upper surface 2a of the substrate 2, by the mirror 5 having the angle of 45[°], and it exits from the core 16 in a direction perpendicular to the upper surface 2a of the substrate 2.

Figure 6B:
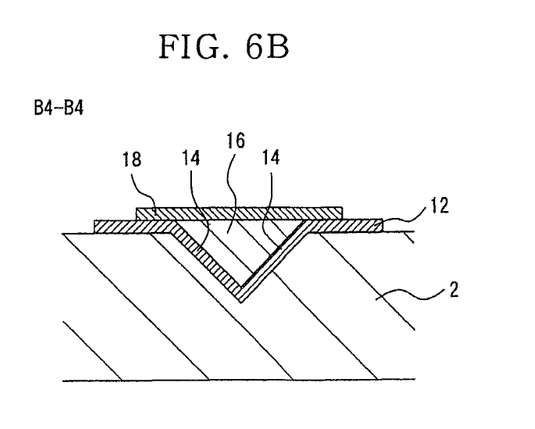

Incidentally, the structure in FIGS. 6A and 6B may well be replaced with a structure in which only one mirror (here, the mirror 4) is disposed, and the light receiving element (not shown) is disposed instead of the mirror 5 at the position thereof.

Subsequently, a method of manufacturing an optical waveguide 1 according to the second embodiment of the present invention will be described.

Figure 7A:
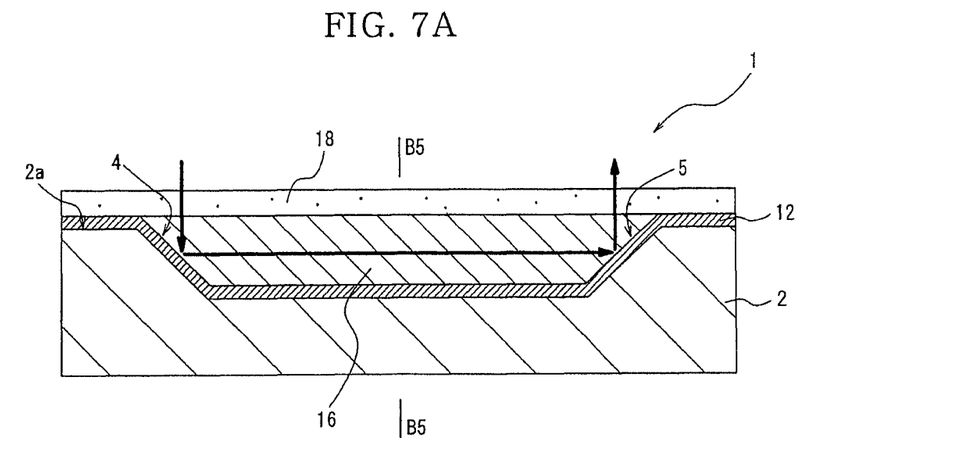
FIGS. 7A and 7B are explanatory views for explaining a method of manufacturing an optical waveguide according to the second embodiment of the present invention.
Figure 7B:
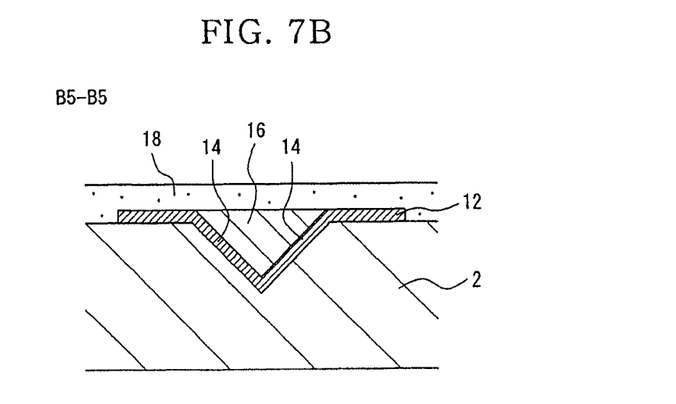

The method of manufacturing the optical waveguide 1 according to this embodiment includes the steps described in the foregoing method of manufacture according to the first embodiment, but it has a point of difference in the step of forming the second clad layer 18.

More concretely, as shown in FIG. 7A (a sectional view) and FIG. 7B (a sectional view), the second clad layer 18 is formed by employing a resin material (for example, a silicone resin) which is capable of transmitting the optical signal. On this occasion, a material whose refractive index is relatively large is employed for the core 16, and a material whose refractive index is relatively small is employed for the second clad layer 18.

Subsequently, a method of manufacturing an optical waveguide 1 according to the third embodiment of the present invention will be described.

Figure 8A:
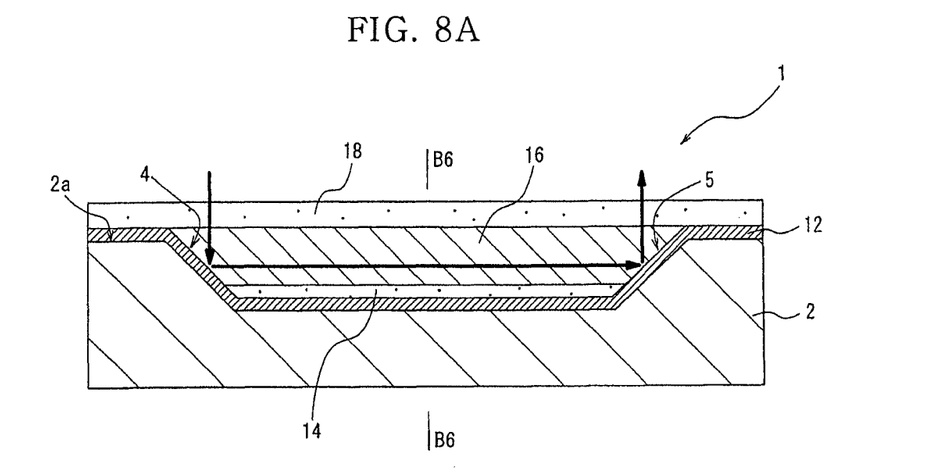
FIGS. 8A and 8B are explanatory views for explaining a method of manufacturing an optical waveguide according to the third embodiment of the present invention.
Figure 8B:
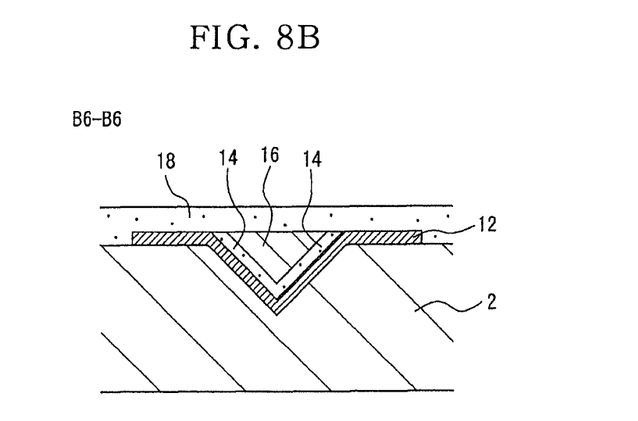

The method of manufacturing the optical waveguide 1 according to this embodiment includes the steps described in the foregoing method of manufacture according to the second embodiment, but it differs in the point that, after the step of forming the metallic reflection film 12 on the whole inner surface of the groove 3, the step of forming the first clad layer 14 by employing a material different from the material of the metallic reflection film 12.

More concretely, as shown in FIG. 8A (a sectional view) and FIG. 8B (a sectional view), the step of forming the first clad layer 14 forms this first clad layer 14 on only the metallic reflection film 12 formed on the (110)-planes 3c and 3d of the groove 3 as are not used as the mirrors 4 and 5. As an example, the same resin material as that of the second clad layer 18 is employed for a material for forming the first clad layer 14.

Subsequently, a method of manufacturing an optical waveguide 1 according to the fourth embodiment of the present invention will be described.

Figure 9A:
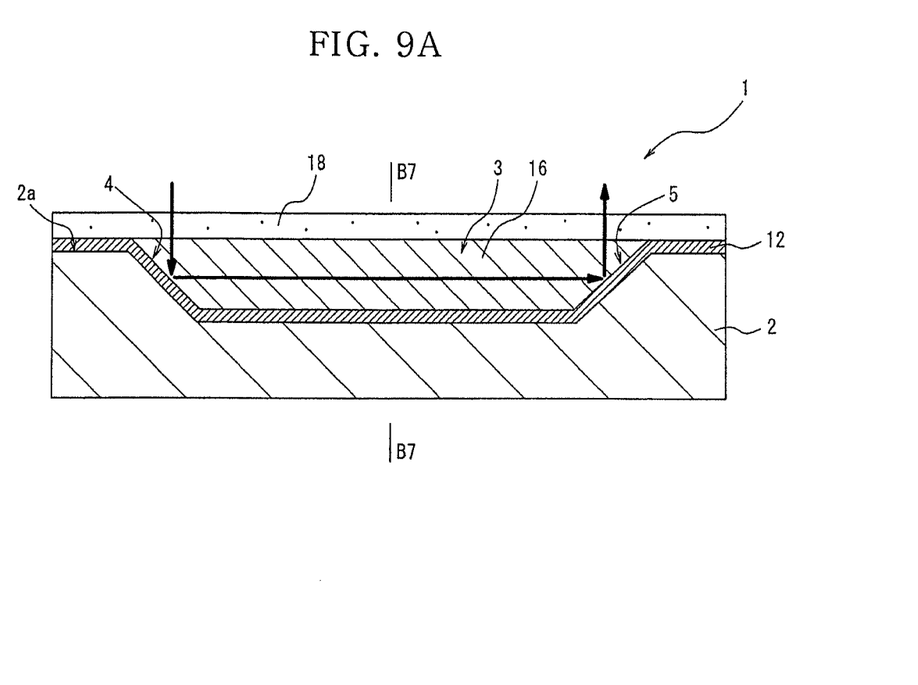
FIGS. 9A and 9B are explanatory views for explaining a method of manufacturing an optical waveguide according to the fourth embodiment of the present invention.
Figure 9B:
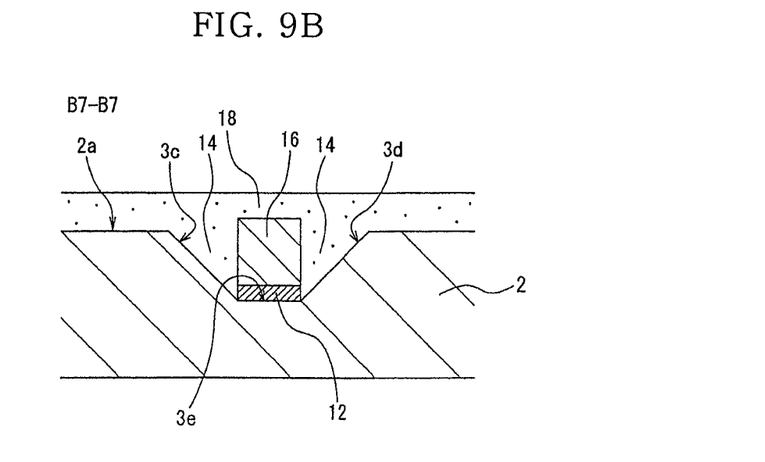

The method of manufacturing the optical waveguide 1 according to this embodiment includes the steps described in the foregoing method of manufacture according to the first embodiment, but it is characterized in that, at the step of etching the (100)-plane of the substrate 2 by the wet etching process whose etching mask is the mask layer 10, an adjustment such as shortening an etching time period is made, thereby to form the groove 3 whose inwalls are the four (110)-planes 3a, 3b, 3c and 3d, and a (100)-plane 3e appearing at the bottom of this groove, totaling five planes (refer to FIG. 9A (a sectional view) and FIG. 9B (a sectional view)).

Regarding the groove 3, in more detail, the four planes of the groove 3 are surrounded with the (110)-planes 3a, 3b, 3c and 3d each of which is inclined the angle of 45[°] to the (100)-plane 2a. That is, the groove 3 has such a shape that a sectional shape parallel to the (100)-plane 2a is an oblong, that a sectional shape perpendicular to the (100)-plane 2a and perpendicular to the (110)-planes 3a and 3b is an inverted trapezoid (it may well be an inverted triangle), and that a sectional shape perpendicular to the (100)-plane 2a and perpendicular to the (110)-planes 3c and 3d is an inverted trapezoid.

Accordingly, the bottom surface 3e of the groove 3 is formed as a surface parallel to the upper surface 2a of the substrate 2. It is therefore permitted to manufacture the optical waveguide 1 which has such a shape that, as shown in FIGS. 9A and 9B, the core 16 of rectangular sectional shape is stacked on the bottom surface 3e through the metallic reflection film 12 (functioning as a clad layer), in a manner to cover its side surface with the first clad layer 14 and to cover its upper surface with the second clad layer 18.

Incidentally, as a material for forming the first clad layer 14 and the second clad layer 18, it is considered to employ the resin material described in the foregoing method of manufacture according to the third embodiment.

Subsequently, optical transmission devices 20 according to embodiments of the present invention will be described.

The favorable optical transmission devices 20 are realized using the optical waveguides 1 manufactured by the manufacturing methods described above. The first embodiment of the optical transmission device 20 is shown in the schematic view (sectional view) of FIG. 10.

Figure 10:
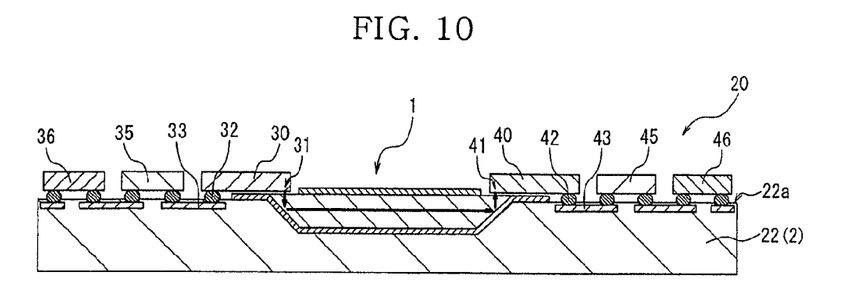
FIG. 10 is a schematic view showing an example of an optical transmission device according to an embodiment of the present invention.

A light emitting element, for example, VCSEL 30 is mounted on the upper surface 22a of a circuit board 22 and in adjacency to one end side of the optical waveguide 1. Here, the circuit board 22, and a substrate 2 in which the optical waveguide 1 is formed can be made a common member.

The light emitting element 30 includes a light emitting portion 31 in the device proper thereof, and it is connected to the land 33 of the circuit board 22 by a bump 32, whereby the electrical connection between this light emitting element 30 and the circuit board 22 is made. Incidentally, the gap between the light emitting element 30 and the circuit board 22 is filled up with a transparent underfill material (not shown).

On this occasion, the light emitting element 30 is positioned to the circuit board 22 so that the optic axis of the light emitting portion 31 may become perpendicular to the upper surface 22a of the circuit board 22, that is, to the upper surface 2a of the substrate 2, and that it may define an angle of 45[°] to one mirror 4.

On the other hand, a light receiving element, for example, PD 40 is mounted on the upper surface 22a of the circuit board 22 and in adjacency to the other end side of the optical waveguide 1.

The light receiving element 40 includes a light receiving portion 41 in the device proper thereof, and as in the case of the light emitting element 30, it is connected to the land 43 of the circuit board 22 by a bump 42, whereby the electrical connection between this light receiving element 40 and the circuit board 22 is made. Incidentally, the gap between the light receiving element 40 and the circuit board 22 is filled up with the transparent underfill material (not shown).

On this occasion, the light receiving element 40 is positioned to the circuit board 22 so that the optic axis of the light receiving portion 41 may become perpendicular to the upper surface 22a of the circuit board 22, that is, to the upper surface 2a of the substrate 2, and that it may define an angle of 45[°] to the other mirror 5.

According to the above configuration, the optical transmission device 20 undergoes an operation in which, as indicated by arrows in FIG. 10, an optical signal perpendicularly entered from the light emitting portion 31 of the light emitting element 30 to the optical waveguide 1 is reflected at an angle of 90 degrees by one mirror 4, it is propagated within the core 16 of the optical waveguide 1, it is reflected at an angle of 90 degrees by the other mirror 5 of the optical waveguide 1, and it is received by the light receiving portion 41 of the light receiving element 40.

Figure 11:
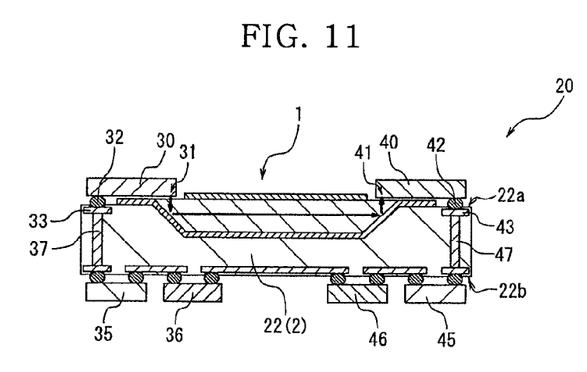
FIG. 11 is a schematic view showing another example of an optical transmission device according to an embodiment of the present invention.

Next, the second embodiment of the optical transmission device 20 is shown in the schematic view (sectional view) of FIG. 11.

The first embodiment described above has the structure in which the control circuit component 35 and logic circuit component 36 of the light emitting element 30, the control circuit component 45 and logic circuit component 46 of the light receiving element 40, and the optical waveguide 1 are mounted on the identical surface (here, the upper surface 22a) of the circuit board 22. The second embodiment differs from the first embodiment in the point of having a structure in which a light emitting element 30, a light receiving element 40 and the optical waveguide 1 are mounted on one surface (here, the upper surface 22a) of a circuit board 22, and the control circuit component 35 and logic circuit component 36 of the light emitting element 30, and the control circuit component 45 and logic circuit component 46 of the light receiving element 40 are mounted on the other surface (here, the lower surface 22b) of the circuit board 22. By the way, in this embodiment, the connection between the light emitting element 30 and the control circuit component 35 and the connection between the light receiving element 40 and the control circuit component 45 are respectively made by providing through-hole vias 37 and 47 in the circuit board 22.

According to the above configuration, the optical wiring (optical waveguide) and the electrical wiring can be separated and formed on the individual surfaces.

As described above, according to the disclosed method of manufacturing the optical waveguide and the optical waveguide manufactured by the manufacturing method, the surfaces on which the mirrors are formed can be obtained as the planes which accurately define the angles of 45[°] to one surface of the substrate. In addition, the surfaces on which the mirrors are formed can be obtained as highly precise and minute flat planes whose surface roughness is much smaller as compared with the surface roughness of planes cut by dicing or the like. Accordingly, it becomes possible to solve both the problem that the taper angle of the surface on which the mirror is formed does not accurately become 45[°], so an optical propagation loss occurs, and the problem that an optical propagation loss occurs on account of the large surface roughness.

Besides, the two surfaces on which one mirror and the other mirror are formed can be obtained as the planes which accurately define the angle of 90[°] each other. Accordingly, in the optical transmission device wherein the optical signal is projected from the light emitting element onto one mirror of the optical waveguide so as to be reflected by one mirror, and the optical signal further reflected by the other mirror is received by the light receiving element, it is permitted to reflect the accurate optical signal and to prevent the optical propagation loss from occurring.

Besides, the step of forming a structure on a dummy board and thereafter transferring the structure onto a formal board is not included. It is therefore permitted to solve the problem that the positioning precision between the optical waveguide and the formal board worsens.

Besides, the optical waveguide is formed within the groove which is provided in the substrate, and a structure in which the optical waveguide portion protrudes beyond the mounting surface of the substrate is not involved. It is therefore permitted to solve the problem that a mounting pad for mounting electronic components must be formed having a raised level.

Figure 16:
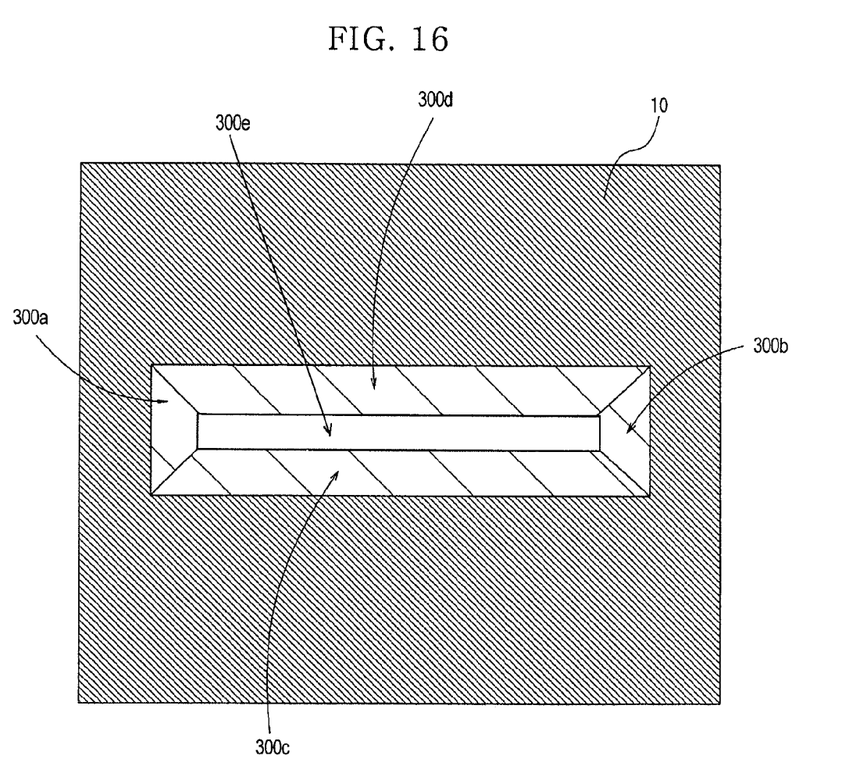
FIG. 16 is an explanatory view for explaining the method of manufacturing the optical waveguide according to another embodiment of the present invention.

Incidentally, it is needless to say that the present invention is not restricted to the embodiments described above, but that it is capable of various alterations within a scope not departing from the purport thereof. For example, the present invention may well be carried out using another configuration of the optical waveguide. Specifically, the mirror, the core and the clad layer may be provided on a substrate 200 that is shown in FIG. 16. According to FIG. 16, a groove 300 has inwalls 300*a* to 300*d* and a lower face 300*e*.

Further, although the Si single-crystal has been exemplified and described as the crystalline material, it is not restrictive, but the present invention may well be carried out using another crystalline material which has a similar property. For example, resin materials such as an acrylic material and inorganic materials such as a glass material can be used as the crystalline material. Further, various materials, for example, aluminums, gold and silver, can be used as the clad layer.

What is claimed is:

1. An optical waveguide comprising:
    a groove having at least four crystal planes formed by wet-etching a first crystal plane of a substrate made of a crystalline material, the groove having a cross-sectional shape that defines an inverted trapezoid or an inverted triangle;
    a mirror portion configured to reflect an optical signal, the mirror being formed by providing a metallic reflection film on the entire surface of the groove such that the metallic reflection film covers the at least four crystal planes;
    a core configured to transmit an optical signal, the core being provided on the groove with a core material; and
    a clad layer formed on an upper surface of the core.

2. The optical waveguide according to claim 1, wherein the mirror portion includes two mirrors that are formed by providing the metallic reflection film on two of the crystal planes that oppose defining an angle of 90°.

3. The optical waveguide according to claim 1, wherein:
    the crystalline material is a silicon single-crystal;
    the first crystal plane is a (100)-plane;
    the at least four crystal planes are (110)-planes; and
    an alkaline etchant is used as an etchant of the wet-etching.

4. An optical transmission device comprising:
    an optical waveguide including:
        a groove having at least four crystal planes formed by wet-etching a first crystal plane of a substrate made of a crystalline material, the groove having a cross-sectional shape that defines an inverted trapezoid or an inverted triangle;
        first and second mirrors that are formed by providing a metallic reflection film on the entire surface of the groove such that the metallic reflection film covers the at least four crystal planes and two of the crystal planes oppose at an angle of 90°;
        a core configured to transmit an optical signal, the core being provided on the groove with a core material; and
        a clad layer formed on an upper surface of the core;
    a light emitting element disposed on the substrate, the light emitting element being configured to project the optical signal to the first mirror; and
    a light receiving element disposed on the substrate, the light receiving element being configured to receive the optical signal reflected by the first mirror and then reflected by the second mirror.

* * * * *